April 25, 1933.   C. J. BASSLER   1,905,549
METER
Filed Dec. 2, 1929
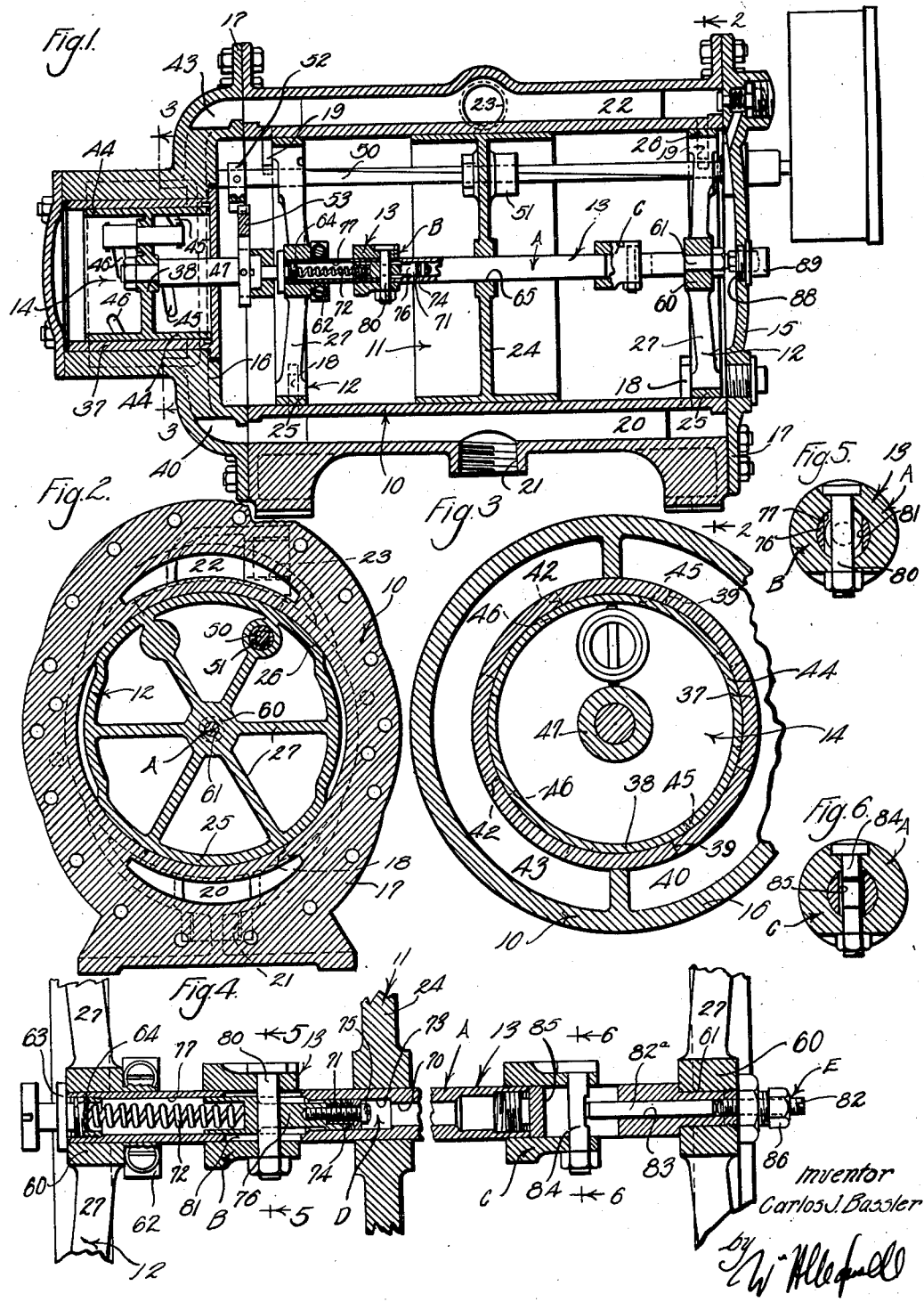
Inventor
Carlos J. Bassler
by his Attorney Patented Apr. 25, 1933

1,905,549

UNITED STATES PATENT OFFICE

CARLOS J. BASSLER, OF ALHAMBRA, CALIFORNIA, ASSIGNOR TO AMERICAN LIQUID METER COMPANY, OF ALHAMBRA, CALIFORNIA, A CORPORATION OF WASHINGTON

METER

Application filed December 2, 1929. Serial No. 410,991.

This invention has to do with a meter and has particular reference to a meter embodying thermostatic means operable to automatically change the volumetric capacity of the meter with change in temperature of liquid being measured, so that the liquid is accurately measured by mass, as distinguished from volume.

It is a general object of the present invention to provide an improved arrangement and formation of parts in a meter of the character mentioned.

The present invention is concerned particularly with an improved construction for applying a thermostatic control means to a displacement meter. For the purpose of facilitating a disclosure of the invention, I will describe one typical form and application of my invention in connection with a meter of the general construction set forth and claimed in my co-pending application entitled Displacement meter, filed February 28, 1929, Serial No. 343,422.

It is to be understood that the present invention embodies various principles applicable generally to displacement meters, and therefore the invention is not to be construed as limited by various details that may be referred to in the course of the following description.

It is an object of this invention to provide an arrangement of parts in a meter whereby a thermostatic control means is embodied in the meter to dependably and accurately control the meter.

It is another object of the invention to provide a displacement meter which embodies a thermostatic control operable to accurately control the action of the meter without the aid of complicated or intricate devices subject to wear or failure.

It is a further object of the present invention to provide a meter of the type hereinabove referred to embodying a very few simple and inexpensive parts.

Another object of the invention is to provide a meter of the character mentioned above in which the working or moving parts are of such nature as to be dependable and positive in operation and to be subject to practically no wear.

The various objects and features of my invention will be best and more fully understood from the following detailed description of a typical form and application of the invention, throughout which description reference will be had to the accompanying drawing, in which:

Fig. 1 is a longitudinal detailed sectional view of a meter embodying a typical form of the present invention. Fig. 2 is a detailed transverse sectional view of the meter taken as indicated by line 2—2 on Fig. 1. Fig. 3 is a detailed transverse sectional view of another part of the meter being a view taken substantially as indicated by line 3—3 on Fig. 1. Fig. 4 is an enlarged longitudinal detailed sectional view of the parts embodying the principal features of the present invention. Fig. 5 is a detailed transverse sectional view taken as indicated by line 5—5 on Fig. 4, and Fig. 6 is a detailed transverse sectional view taken as indicated by line 6—6 on Fig. 4.

To facilitate an understanding of the general construction in combination with which the invention is illustrated, I will first give a general description of the meter.

The meter includes, generally, a measuring chamber or cylinder 10, a fluid displacing member or piston 11 operable in the cylinder, valve means 12 at the ends of the cylinder controlling the flow of fluid to and from the cylinder, means 13 operatively connecting the piston 11 and valve means 12 whereby the valve means is actuated from the piston 11, and auxiliary valve actuating means 14 operable to carry the valve means 12 past or beyond the position to which its parts are moved by the piston 11, to give them lead so that the mechanism reverses its direction of action.

The cylinder 10 is of suitable dimensions and is closed at its ends by heads 15 and 16. The heads are connected to the ends of the cylinder by suitable flange connections 17. The meter being double acting, the cylinder is provided at each end with an inlet port 18 and an outlet port 19. In the construction illustrated the ports are in the form of slots cut in or through the wall of the cylinder to communicate with manifolds at the exterior of the cylinder. The inlet ports 18 communicate with an intake manifold 20 having a receiving opening 21, while the outlet ports 19 communicate with an outlet manifold 22 having a discharge opening 23.

The piston 11 is slidably mounted in the cylinder and has a body or web 24 which completely separates the two ends of the cylinder.

The valve means 12, provided for controlling the flow of fluid to and from the ends of the cylinder, includes slide valves 25 and 26 at each end of the cylinder cooperating with the ports 18 and 19, respectively. The valves 25 and 26 slidably fit the interior or wall of the cylinder and are adapted to move longitudinally in the cylinder to open and close the ports. The valves 25 and 26 at each end of the cylinder are connected together by suitable ribs 27. The valve parts 25 and 26 are related to each other and to the ports 18 and 19 so that the valve means can be positioned with the inlet port 18 open and the outlet port 19 closed, or the outlet port open and the inlet port closed. The former positioning is illustrated at the right in Fig. 1 while the latter is illustrated at the left in Fig. 1. Further, the parts are such that the valve parts 25 and 26 may be moved to a dead center position, that is, a position where both inlet and outlet ports are closed.

In the meter shown the means 13 operatively connects the piston 11 and the valve means 12 so that the valve means is moved to dead center position as the piston reaches either end of its stroke and the auxiliary valve means 14 is provided to move the valve means 12 beyond the dead center position to reverse the piston upon its reaching either end of its stroke. The means 13, the details of which will be hereinafter described, connects the valves at the two ends of the cylinder and is cooperatively related to the piston 11 to obtain the action just described.

The auxiliary valve actuating means 14 is operable to carry the valve means 12 past dead center, that is, past the position to which the valve parts are operated by the piston so that the valve means has lead to cause the mechanism to reverse. The particular means 14 illustrated in the drawing includes, generally, an auxiliary cylinder 37, a piston 38 operable in the cylinder, and ports in the cylinder and piston cooperating to admit fluid pressure to the ends of the cylinder to cause operation of the piston. The cylinder 37 is shown carried by the head 16 of the cylinder 10 and is provided at each end with an inlet port 39 which opens into a passage 40 communicating with the manifold 20 and with an outlet port 42 which communicates with a passage 43 opening into the manifold 22.

The piston 38 has sleeve parts 44 at its two ends, each part 44 being provided with ports 45 and 46 to cooperate with the ports 39 and 42, respectively. The piston 38 is operatively connected with the unit formed by the valve means 12 and the means 13. In the case illustrated, a rod 47 connects the piston 38 with the said unit. The piston 38 is moved longitudinally in the cylinder through the connection just described and is rotated in the cylinder by means of a shaft 50 operatively connected with the piston 11 and a drive between the shaft 50 and the rod 47. The shaft 50 is carried between the heads of the cylinder 10 and extends through a block 51 in the piston 11. The shaft 50 is polygonal in cross section and made spiral, or pitched. The shaft fits the block 51 so that movement of the piston in the cylinder causes the shaft to rotate. The rotation of the shaft 50 is communicated to the rod 47 by a gear segment 52 fixed on the shaft 50 meshing with a gear segment 53 fixed on the rod 47. The various parts of the means 14 are constructed and related so that the ports in the means 14 have lead when the valve means 12 is moved to dead center causing the piston 38 to move in the cylinder 37 so that the valve means 12 is carried past dead center. The rotation of the piston 38 through the construction described reverses the lead in the ports of the means 14 so that the desired action takes place when the piston 12 reaches each end of its stroke. The details of this mechanism are fully set forth and are claimed in my co-pending application above identified.

The means 13 operatively connecting the piston 11 and valve means 12 includes, generally, a rod A extending between the valve means at the two ends of the cylinder and through the piston 11 located in the cylinder, stops B and C in connection with the rod to cooperate with the piston, thermally actuated means D for adjusting one of the stops, and manual means E for adjusting the other stop.

The rod A extends longitudinally in the cylinder 10 and has its ends connected to the ribs 27 which connect the valve parts 25 and 26. In the construction shown the ribs 27 are attached to hubs 60 which receive the ends of the rod A. The hub 60 at one end of the cylinder is carried on a reduced part 61 at the end of the rod, while the hub part 60 at the other end of the cylinder is carried on the rod between a collar 62 and the flange 63 of a plug 64 screw threaded into the rod, as will be hereinafter described. The rod A is round in cross section and slidably fits an opening 65 formed through the web or body 24 of the piston 11.

The stops B and C are preferably mounted directly on the rod A at opposite sides of the piston 11 and are adapted to be engaged by the piston 11 so that the rod A is operated longitudinally by the piston. The piston, when moving to the left in the cylinder, engages the stop B and moves the rod A to the left until the valve means 12 reaches dead center position at which time the movement of the piston stops. The rod is then moved further to the left through the action of the auxiliary valve actuating means 14 above referred to. When the piston moves to the right in the cylinder it engages the stop C, moving the rod A to the right until the valve means 12 reaches dead center position at which time the piston 11 stops. The rod A and valve means 12 are moved further to the right through the action of the auxiliary valve actuating means 14 above referred to. It will be obvious that the positioning of the stops longitudinally on the rod, that is, the spacing of the stops on the rod, determines the length of stroke of the piston 11 in the cylinder 10 and therefore the volume of fluid passed by the meter on each stroke of the piston.

The present invention provides thermally actuated means for adjusting or varying the spacing of the stops on the rod to adjust or vary the stroke of the piston in the cylinder and thus compensate for change in temperature of the liquid being metered. The invention causes the meter to accurately measure mass regardless of volume, volume being a characteristic which is variable with temperature.

In the particular form of the invention being described the stop B is slidably mounted on the rod A and is adapted to be adjusted, or varied as to position lengthwise of the rod, through action of the thermostatic means D. The stop B is illustrated in the form of a collar surrounding the rod and slidable longitudinally on the rod. The thermostatic means D includes a liquid filled opening 70 preferably formed directly in the rod A, a piston 71 operable in the opening to be moved by expansion of the liquid contained in the opening, means 72 for returning the piston upon contraction of liquid in the opening, and an operating connection between the piston and the stop B. In the form of construction shown the opening 70 is formed longitudinally in the rod A and is provided at one end with a finished cylindrical part 73 which slidably carries the piston 71. The other end of the opening is tightly closed.

The piston 71 slidably fits the cylinder 73 and includes a washer or packing means 74 made tight in the cylinder by means of a compression screw 75. The piston has an extension 76 which projects beyond the cylindrical part 73. The extension 76 is slidably guided in a bore 77 formed in the rod A to carry the means 72. The means 72 may be in the form of a compression spring, preferably a helical spring, arranged in the bore 77 between the end of the extension 76 and the plug 64 which is screw threaded into the outer end of the bore 77. The spring 72 is normally under compression so that it urges the piston inwardly in the cylinder against the body of liquid contained in the opening 70.

The operating connection between the piston 71 and the stop B may include a pin 80 carried transversely by the piston extension 76 to project outwardly through longitudinal slots 81 in the rod A to engage the stop B. The pin 80 is illustrated in the drawing in the form of a bolt which extends through the stop B, the longitudinal slots 81, and the piston extension 76, as clearly illustrated in Fig. 4 of the drawing. Through this connection the stop B is moved longitudinally on the rod A by means of the piston 71.

The stop C is arranged on the rod at the opposite side of the piston, that is, at the side opposite the stop B, and may be in the form of a collar carried in the rod A. In accordance with the preferred form of the invention, the stop C is in fixed position on the rod A during operation of the meter. This stop is adapted to be adjusted as to its position on the rod through the means E. In the construction shown the means E includes an adjusting screw 82 screw threaded in an opening 83 extending into the rod A through the reduced part 61 above described. The screw 82 operates a push rod 82ª which is slidably mounted in the opening 83 and which engages a cross pin 84 which is carried by the stop C and extends through a slot 85 formed transversely through the rod A. The slot 85 extends longitudinally of the rod to allow the stop C to be adjusted or moved longitudinally of the rod. A lock nut 86 is carried on the projecting end of the screw 82 to be set against the end of the rod so that the screw is locked in position. The cylinder head 15 is provided with an opening 88 opposite the screw 82 which opening is fitted with a removable cap 89. To manually adjust the stroke of the piston 11 in the cylinder, it is merely necessary to remove the cap 89 and manipulate the screw 82 in the desired manner.

From the foregoing description it is believed that the general operation of the meter will be fully understood, it being obvious how the piston 11 reciprocates in the cylinder engaging the stops B and C so that the rod A is operated to move the valve means 12. As stated above, the spacing of the stops B and C on the rod A determines the stroke of the piston and therefore the volume of fluid passed by the meter. With the construction above described, the temperature of the fluid being metered, or being passed through the meter, acts on the fluid contained in the opening 70 in the rod A to vary the position of the stop B on the rod in accordance with the temperature of the liquid being metered. In practice it is desirable to fill the opening 70 in the rod A with material the same as that being handled by the meter, for example, if a crude oil is to be handled by the meter, it is preferred to fill the opening 70 with crude oil. It will be apparent how the expansion of fluid in the opening 70 will move the piston 71 outwardly in the cylinder 73 and thus move the stop B away from the stop C. Likewise it will be apparent how the spring 70 returns the piston 71 in the cylinder as the liquid in the opening 70 cools, moving the stop B toward the stop C.

From the foregoing description it will be apparent that the construction provided by this invention automatically adjusts or regulates the stroke of the piston 11, according to the temperature of the liquid being passed through the meter, so that liquid is measured as to its mass, as distinguished from volume. The manual adjusting means E provides for making general adjustments in the mechanism while the thermostatic means D operates automatically to adjust the meter while it is in operation.

It is to be particularly noted that the construction provided by this invention is extremely simple and inexpensive of manufacture and that it involves but few, dependable parts. The various parts involved in the construction are such as to be subject to little or no wear, and therefore the device will last indefinitely.

Having described only a typical, preferred form and application of my invention, I do not wish to limit myself to the specific details set forth, but wish to reserve to myself any changes or variations that may appear to those skilled in the art or fall within the scope of the following claims:

Having described my invention, I claim:

1. In a meter, a measuring chamber having inlet and outlet openings, a fluid displacing part operable in the chamber, valve means for controlling flow of fluid through said openings, and an operating connection between the valve means and said part through which the valve means is operated by said part, said connection including thermostatic regulating means through which motion is communicated from said part to the valve means to cause operation of the valve means.

2. In a meter, a measuring chamber having inlet and outlet openings, a fluid displacing part operable in the chamber, valve means for controlling flow of fluid through said openings, a valve operating rod engaged by said part to be operated thereby, and thermostatic regulating means carried by the rod for regulating the operative relation between said part and the valve means.

3. In a meter, a measuring chamber having inlet and outlet openings, a fluid displacing part operable in the chamber, valves controlling said openings, a rod connecting the valves and connected with said part to be operated thereby, and thermostatic regulating means carried by the rod for regulating the operative relation between said part and the valve means.

4. In a meter, a measuring chamber having inlet and outlet openings, a fluid displacing part operable in the chamber, valves controlling said openings, a rod connecting the valves and operable to actuate the valves, means whereby the rod is operated by said part, and thermostatic regulating means in the rod.

5. In a meter, a measuring chamber having inlet and outlet openings, a fluid displacing part operable in the chamber, a control unit including valves controlling said openings and a rod connecting the valves, and a thermally controlled operating connection between said part and the rod including a stop on the rod adapted to be engaged by the said part to operate the rod, and temperature responsive means carried by the rod for varying the operative relationship of the said part and the stop.

6. In a meter, a measuring chamber having inlet and outlet openings, a fluid displacing part operable in the chamber, a control unit including valves for controlling said openings and a rod connecting said valves, operative connections between the said part and the rod, said part and rod having relative movement, thermostatic means carried by the rod for regulating the operative connections to vary the said relative movement in one direction, and manual means for regulating the operative connections to vary said relative movement in the other direction.

7. In a meter, a measuring chamber having inlet and outlet openings, a fluid displacing part operable in the chamber, valves controlling the openings, a rod connecting the valves, means whereby the rod is operated by said part, and thermostatic regulating means carried by the rod for regulating the operative relation between said part and the rod, and manual adjusting means for regulating the operative relation between said part and the rod.

8. In a meter, a cylinder having inlet and outlet openings, a piston operable in the cylinder, valves controlling flow to and from the cylinder through said openings at opposite sides of the piston, a rod extending through the piston and connecting the valves, the rod carrying parts to be cooperatively engaged by the piston, and said rod also carrying thermostatic means operable to vary the operative relationship of the piston and said parts.

9. In a meter, a cylinder having inlet and outlet openings, a piston operable in the cylinder, valves controlling flow to and from the cylinder through said openings at opposite sides of the piston, a rod extending through the piston and connecting the valves, spaced parts on the rod to be cooperatively engaged by the piston, and thermostatic means operable to vary the spacing of the parts on the rod.

10. In a meter, a cylinder having inlet and outlet openings, a piston operable in the cylinder, valves controlling flow to and from the cylinder through the openings, a rod extending through the piston and connecting the valves, parts on the rod at opposite sides of the piston to be cooperatively engaged by the piston, and thermostatic means operable to vary the position of one of the parts on the rod.

11. A meter valve rod including, a rod, spaced stops on the rod, and thermostatic means carried by the rod for varying the spacing of the stops.

12. A meter valve rod including, a rod, spaced stops on the rod, means for manually adjusting one of the stops on the rod and thermostatic means carried by the rod operable to adjust one of the stops on the rod.

13. A meter valve rod including, a rod, two spaced stops on the rod, means for manually adjusting one of the stops on the rod, and thermostatic means carried by the rod operable to adjust the other stop on the rod.

14. A meter valve rod including, a rod having an opening therein, spaced stops on the rod, and thermostatic means in the opening in the rod for varying the spacing of the stops.

15. A meter valve rod including, a rod having a fluid carrying opening, a piston operable in the opening and confining fluid in the opening, a stop carried on the rod, and means operatively connecting the piston and stop.

16. A meter valve rod including, a rod having a fluid carrying opening, a piston operable in the opening and confining a body of fluid in the opening, means normally yieldingly urging the piston against fluid in the opening, a stop carried on the rod, and means operatively connecting the piston and stop.

In witness that I claim the foregoing I have hereunto subscribed my name this 4th day of November, 1929.

CARLOS J. BASSLER.